(12) United States Patent
Bull et al.

(10) Patent No.: US 8,409,546 B2
(45) Date of Patent: Apr. 2, 2013

(54) PROCESS FOR THE PREPARATION OF ZEOLITES HAVING B-CHA STRUCTURE

(75) Inventors: Ivor Bull, Ludwigshafen (DE); Ulrich Mueller, Neustadt (DE)

(73) Assignee: BASF SE, Ludwigshafen (DE)

( * ) Notice: Subject to any disclaimer, the term of this patent is extended or adjusted under 35 U.S.C. 154(b) by 241 days.

(21) Appl. No.: 12/950,137

(22) Filed: Nov. 19, 2010

(65) Prior Publication Data

US 2011/0142755 A1    Jun. 16, 2011

Related U.S. Application Data

(60) Provisional application No. 61/263,833, filed on Nov. 24, 2009.

(51) Int. Cl.
*C01B 33/36* (2006.01)
*C01B 39/04* (2006.01)
*C01B 39/00* (2006.01)

(52) U.S. Cl. ......... 423/703; 423/702; 423/704; 423/700

(58) Field of Classification Search .................. None
See application file for complete search history.

(56) References Cited

U.S. PATENT DOCUMENTS

| | | | |
|---|---|---|---|
| 3,030,181 A | 4/1962 | Milton | |
| 3,306,922 A | 2/1967 | Barrer et al. | |
| 4,060,590 A | 11/1977 | Whittam et al. | |
| 4,310,440 A | 1/1982 | Wilson et al. | |
| 4,473,663 A | 9/1984 | Patton et al. | |
| 4,544,538 A | 10/1985 | Zones | |
| 4,737,353 A | 4/1988 | Flanigen et al. | |
| 6,709,644 B2 | 3/2004 | Zones et al. | |
| 2003/0176751 A1 | 9/2003 | Strohmaier et al. | |
| 2006/0115400 A1 | 6/2006 | Yuen et al. | |
| 2006/0115401 A1 | 6/2006 | Yuen et al. | |
| 2006/0115423 A1 | 6/2006 | Yuen et al. | |
| 2006/0116541 A1 | 6/2006 | Yuen et al. | |
| 2008/0095683 A1 | 4/2008 | Yuen et al. | |
| 2008/0233031 A1 | 9/2008 | Yuen et al. | |
| 2009/0131730 A1 | 5/2009 | Yuen et al. | |
| 2011/0020204 A1 | 1/2011 | Bull et al. | |

FOREIGN PATENT DOCUMENTS

| | | |
|---|---|---|
| EP | 0 158 348 A2 | 10/1985 |
| EP | 0 158 975 A2 | 10/1985 |
| EP | 0 161 490 A2 | 11/1985 |
| GB | 868846 | 5/1961 |
| WO | WO-2006/060101 | 6/2006 |
| WO | WO 2008/106519 A1 | 9/2008 |
| WO | WO 2008/118434 A1 | 10/2008 |
| WO | WO 2008/132452 A2 | 11/2008 |
| WO | WO 2009/064724 A2 | 5/2009 |
| WO | WO 2009/064725 A2 | 5/2009 |
| WO | WO 2009/091455 A2 | 7/2009 |

OTHER PUBLICATIONS

EP Search Report in EP 10 19 2003, dated May 31, 2011, 2 pgs.

*Primary Examiner* — Melvin C Mayes
*Assistant Examiner* — Bijay Saha
(74) *Attorney, Agent, or Firm* — Servilla Whitney LLC

(57) ABSTRACT

The present invention relates to a process for the preparation of zeolites having B-CHA framework structure and a composition comprising the molar ratio (n $SiO_2$):$B_2O_3$, wherein n is at least 10, the process comprising (i) preparation of an aqueous solution containing at least one source for $B_2O_3$, at least one source for $SiO_2$, at least one source of seeding crystals of chabazite structure, at least one organic structure directing agent (SDA) other than Tetramethylammonium hydroxide (TMAOH), acting as a template for the B-CHA structure, and Tetramethylammonium hydroxide (TMAOH), wherein the SDA or mixtures thereof are employed in such amounts that the aqueous solution in (i) exhibits a molar ratio of SDA:TMAOH of 0.01 to 5; (ii) hydrothermal crystallization of the aqueous solution according to (i); wherein B-CHA is essentially free of alkali metal and/or alkaline earth metal and the ratio of the [molar ratio ($SiO_2$:$B_2O_3$)] of the gel composition:[molar ratio ($SiO_2$:$B_2O_3$)] of the crystalline product having the chabazite structure is greater than 0.5.

11 Claims, No Drawings

PROCESS FOR THE PREPARATION OF ZEOLITES HAVING B-CHA STRUCTURE

The present invention relates to a process for the preparation of zeolites having B-CHA framework structure and a composition comprising the molar ratio (n $SiO_2$):$B_2O_3$, wherein n is at least 10, the process comprising
 (i) preparation of an aqueous solution containing at least one source for $B_2O_3$, at least one source for $SiO_2$, at least one source of seeding crystals of chabazite structure, at least one organic structure directing agent (SDA) other than Tetramethylammonium hydroxide (TMAOH), acting as a template for the B-CHA structure, and Tetramethylammonium hydroxide (TMAOH), wherein the SDA or mixtures thereof are employed in such amounts that the aqueous solution in (i) exhibits a molar ratio of SDA:TMAOH of 0.01 to 5;
 (ii) hydrothermal crystallization of the aqueous solution according to (i);
wherein the ratio of the [molar ratio ($SiO_2$:$B_2O_3$)] of the gel composition:[molar ratio ($SiO_2$:$B_2O_3$)] of the crystalline product having the chabazite structure is greater than 0.5.

The present invention also relates to the zeolitic materials obtainable and/or obtained by this process as well as to a zeolitic material as such, having framework structure B-CHA, having a composition comprising the molar ratio (n $SiO_2$):$B_2O_3$, wherein n is at least 10, and wherein the ratio of the [molar ratio ($SiO_2$:$B_2O_3$)] of the gel composition:[molar ratio ($SiO_2$:$B_2O_3$)] of the crystalline product having the chabazite structure is greater than 0.5.

Zeolitic materials having chabazite (CHA) framework structure are widely used in important actual technical areas such as in the automotive industry where the materials are employed as catalysts. The reduction of nitrogen oxides with ammonia to form nitrogen and $H_2O$ can be catalyzed by metal-promoted zeolites to take place preferentially to the oxidation of ammonia by the oxygen or to the formation of undesirable side products such as $N_2O$, hence the process is often referred to as the "selective" catalytic reduction ("SCR") of nitrogen oxides, and is sometimes referred to herein simply as the "SCR" process. The catalysts employed in the SCR process ideally should be able to retain good catalytic activity over the wide range of temperature conditions of use, for example, 200° C. to 600° C. or higher, under hydrothermal conditions and in the presence of sulfur compounds. High temperature and hydrothermal conditions are often encountered in practice, such as during the regeneration of the catalyzed soot filter, a component necessary for the aftertreatment of exhaust off-gas. Thus, these materials are of high economical and ecological interest. Due to the said technical areas and the resulting need of high amounts of the materials, there is an increasing demand for efficient processes for the preparation of these materials.

Molecular sieves are classified by the Structure Commission of the International Zeolite Association according to the rules of the IUPAC Commission on Zeolite Nomenclature. According to this classification, framework-type zeolites and other crystalline microporous molecular sieves, for which a structure has been established, are assigned a three letter code and are described in the Atlas of Zeolite Framework Types, 5th edition, Elsevier, London, England (2001). Chabazite is one of the molecular sieves for which a structure has been established, and the material of this framework-type is designated as CHA. Zeolitic materials as used herein are defined as metallosilicate frameworks including aluminosilicates, borosilicates and gallosilicates. It does not include the MeAPSO, APSO, or AlPO family of materials.

Chabazite is a zeolite which occurs in nature and also has synthetic forms. Synthetic forms are described in "Zeolite Molecular Sieves" by Breck (1973). The structure of Chabazite is described in "Atlas of Zeolite Structure Types" by Meier and Olson (1978). The Chabazite structure has been designated with the structure code, "CHA".

Natural Chabazite exists in nature and has a $SiO_2$:$Al_2O_3$ typically less than 10. Synthetic forms of this low $SiO_2$:$Al_2O_3$ range include zeolite "K-G", zeolite D and zeolite R. Zeolite "K-G" is reported by Barrer et al. in J. Chem. Soc., 1956, p 2892-. Zeolite D is reported in British patent number 868,846. Zeolite R is reported in U.S. Pat. No. 3,030,181.

Synthesis of high-silica Chabazite (>10 $SiO_2$:$Al_2O_3$) is reported in U.S. Pat. Nos. 4,544,538, 6,709,644 and US 2003/0176751 A1.

Borosilicate versions of Chabazite are the subject of a number of patent applications. US2003/0176751 A1 discloses zeolites having the CHA structure with a $SiO_2$:$Al_2O_3$ below and above 265. The reaction mixture contains hydrofluoric acid and results in a low wt % yield based on silica. It also discloses the incorporation of other metals in the zeolitic framework including boron, iron, indium, and/or gallium.

US2008/0233031 A1 and WO2009/091455 disclose a boron-containing molecular sieve CHA with $SiO_2$:$B_2O_3$ of 15 to 125. Examples 6, 8, 11 and 17 indicate that the gel molar ratio $SiO_2$:$B_2O_3$ greatly differs from the product $SiO_2$:$B_2O_3$. For example, preparation #6 has a 12.33 $SiO_2$:$B_2O_3$ in the gel, but the product has 39 $SiO_2$:$B_2O_3$. The disclosed ratios of the [molar ratio ($SiO_2$:$B_2O_3$)] of the gel composition:[molar ratio ($SiO_2$:$B_2O_3$)] of the crystalline product is in the range from 0.27 to 0.32. The later publication also indicates yields based on wt % silica that exceed 50, 60, 80 and 90%. A ratio $OH^-$/Si of 0.2 to 0.45 is disclosed.

US2009/0131730 A1, WO2009/064724, and US2006/0116541 A1 disclose the application of the boron-containing molecular sieve in oxgenate conversion resulting in light olefin products.

US2006/0115423 A1 discloses the application of the boron molecular sieve for gas separation.

US2006/0115400 A1 discloses the application of the boron-molecular sieve for treatment of engine exhaust gas. This would act as a catalyst to convert hydrocarbons to innocuous products. The molecular sieve can also contain metals such as platinum, palladium, rhodium, ruthenium, and mixtures thereof.

WO2009/064725 A2, US2008/0095683 A1, and US2006/0115401 A1 disclose the application of the boron-containing molecular sieve in the reduction of oxides of nitrogen in a gas stream. The molecular sieve can also contain metals such as cobalt, copper, platinum, iron, chromium, manganese, nickel, zinc, lanthanum, palladium, rhodium, and mixtures thereof.

U.S. Pat. No. 6,709,644 discloses a high-silica CuChabazite (SSZ-62) with small crystal size (<0.5 microns) with application in SCR of NOx.

WO 2008/106519 discloses a catalyst comprising: a zeolite having the CHA crystal structure and a mole ratio of silica to alumina greater than 15 and an atomic ratio of copper to aluminum exceeding 0.25. The catalyst is prepared via copper exchanging $NH_4^+$-form CHA with copper sulfate or copper acetate. Catalytic activity is largely retained after hydrothermal aging at 850° C. for 6 hours.

WO 2008/132452 discloses a number of zeolite materials, including CuSSZ-13, that can be loaded with iron and/or copper. Catalytic activity is largely retained after hydrothermal aging of CuSSZ-13 at 900° C. for 1 hour. Although no specific mention of Na levels appears it is stated than an ammonium exchange is employed prior to the Cu exchange to remove Na.

WO 2008/118434 indicates that a CuSSZ-13 (15 to 60 $SiO_2:Al_2O_3$) material that can retain at least 80% of its surface area and micropore volume after hydrothermal aging at 900° C. in 10% steam for 1 to 16 hours would be suitable for application in SCR. Example 3 indicates that an ammonium exchange is carried out to remove residual Na. Additionally, a comparison of medium-sized crystals to large-sized crystals of SAPO-34 indicated improved stability for the larger crystals.

In all cases Na is first removed by ammonium exchange prior to the introduction of Cu. The resultant Na content is not disclosed. In table 8 of U.S. Pat. No. 4,544,538 Na contents of >0.5% $Na_2O$ are reported for examples 2 through 5 following ammonium exchange. Prior to ammonium exchange the Chabazites prepared with alkali metal hydroxides in the synthesis gel would be expected to contain >0.5 wt % $Na_2O$.

The state of the art preparation of a Cu-Chabazite is described by the following key steps:
1. Crystallization of a alkali metal/SDA containing chabazite and separation from the synthesis gel
2. Drying and calcination to remove the SDA leading to the H-Na(alkali) form of Chabazite
3. Ammonium exchange to remove alkali metals
4. Copper exchange to introduce Cu Removal of alkali metals is important for the stability and activity of SCR catalysts. WO 2008/132452 suggests that the poor SCR performance of an alkali-metal containing CuChabazite could be attributed to poisoning of the acid sites and report little activity even in the fresh catalyst. Whereas, U.S. application having the Ser. No. 12/612,142 filed on Nov. 4, 2009 indicates good SCR performance of a CuChabazite prepared from a similar parent material where the alkali-metals have been largely removed supporting the importance of low alkali-metal content.

Many catalytic uses for zeolitic materials involve the H-form and so step 2 of the inventive process already delivers an active material without the need for further processing. Such an application could include catalysts used in methanol to olefin chemistry.

Furthermore, the ion-exchange steps can lead to dealumination/deboronation due to the acidic pH conditions employed. The dealumination/deboronation limits the amount of active cations that can be introduced since it results in loss of exchange capacity and can lead to instability of the zeolite structure. Dealumination is linked to instability of SCR catalysts such as CuZSM-5 (Journal of Catalysis, 1996, p 43-).

Thus, the disadvantage of the multi-step synthesis route is the deboronation which occurs in every exchange step. In addition, every exchange step results in a decrease of surface area. Consequently, the ratio of [molar ratio $(SiO_2:B_2O_3)$] of the gel composition:[molar ratio $(SiO_2:B_2O_3)$] of the crystalline product varies strongly and is in the range from about 0.25 to about 0.5. The calculation of a preferred molar ratio of the $[SiO_2:B_2O_3]$ of the gel composition is therefore a big challenge even for a skilled person in the art.

Tetramethylammonium hydroxide (TMAOH) has been utilized as a templating agent and $OH^-$ source in numerous zeolite, zeolitic (e.g. borosilicate, gallosilicate etc) and non-zeolitic (i.e. AIPO, MeAPO, and MeAPSO compositions) syntheses including the preparation of ATT, CAN, CHA, EAB, ERI, ERI/OFF, FAU, FER, GIS, GME, LTA, MAZ, OFF, and SOD.

Barrer et al. discusses the role of $OH^-$ as a mineralizing agent together with the structure directing role of cations such as alkali metals and organic additives or templates (Zeolites, 1981, p130). Control of both is critical for the selective crystallization of zeolite phases.

A number of Aluminophosphate materials can be crystallized using TMAOH including AlPO-12 (ATT—J. Phys. Chem., 1986, p6122), AlPO-33 (ATT—U.S. Pat. No. 4,473,663), ZnAPSO-43 (GIS—EP 158,975), ALPO-20 (SOD—U.S. Pat. No. 4,310,440), BeAPSO-20 (SOD—U.S. Pat. No. 4,737,353), MgAPSO-20 (SOD—EP 158,348), MnAPSO-20 (SOD—EP 161,490) and ZnAPSO-20 (SOD—EP 158,975). These systems are synthesized in the absence of an alkali metal hydroxide since these materials typically crystallize in near neutral pH or less alkaline pH than the aluminosilicates materials. Consequently, these materials are considered alkali-metal free. Tetramethylammonium (TMA) is occluded within the microporous cavities of the material during crystallization.

The synthesis of the aluminosilicates ERI and OFF are described in many articles due to the overlapping synthesis conditions that often result in the intergrown product of the two known as ZSM-34. This complexity is comprehensively described in Zeolites, 1986, p 745. In all cases alkali metal hydroxides are used in combination with TMA. This paper represents the structures of ERI and OFF with the TMA cation occluded within the cages. The independent phases can be prepared by careful control of gel composition. Barrer et al. described the combination of TMA with alkali metal hydroxides for the preparation of CAN, LTA, OFF, ERI, EAB, GME, SOD and MAZ (Zeolites, 1981, p 130). The aluminosilciate, EAB crystallizes from a Na or K and TMA gel at temperatures of about 80° C. (J. Solid State Chem., 1981, p 204). In all cases the syntheses report a combination of TMA with an alkali metal resulting in the incorporation of both in the zeolite product.

Chabazite (zeolite ZK-14) with low $SiO_2:Al_2O_3$ has also been reported to form with (K, Na, TMA) mixtures where K is preferred (Molec. Sieves, Soc. Chem. Ind., 1968, p 85). U.S. Pat. No. 4,544,538 teaches the synthesis of high silica chabazite from trimethyladaman-tylammonium hydroxide (TMAA) and sodium hydroxide reaction gels. It is mentioned that sodium hydroxide could be replaced by the addition of more template, whereas the template is typically a bicycle hetereoatom compound. It is disclosed that the preferred OH/Si ratio is <0.96 for the formation of chabazite with >20 $SiO_2:Al_2O_3$. However, the addition of more template would result in a significant increase in cost and perhaps issues with waste water due to increased residual organic in the mother liquor following crystallization.

Zeolite RUT (Nu-1—U.S. Pat. No. 4,060,590 and RUB10, Z. Kristallogr., 1995, p 475) is formed from gels containing TMAOH with crystallization temperatures of 150 to 200° C. and reaction times of about 1.5 to 3 days. This is a common impurity phase when TMAOH is used as a replacement for alkali metal hydroxides in Chabazite synthesis due to similar reaction conditions. Increased amounts of TMAOH lead to RUT becoming the majority phase.

U.S. Pat. No. 3,306,922 describes a synthesis of zeolites N-X and N-Y (FAU), N-B and N-A (LTA) containing a substantial weight percent of a cation other than sodium or other metal cation. Specifically a low Na product is attained by using TMAOH as the only source of $OH^-$ and structure direction.

The prior art indicates that use of TMAOH, as the only organic source and in the absence of alkali-metals, would result in zeolites RUT, N-X, N-Y. N-B or N-A. No reports exist of Chabazite formation in the presence of only TMAOH.

Therefore, it is an object of the present invention to provide a time and cost saving process for the preparation of zeolitic materials having B-CHA framework structure minimizing deboronation during preparation.

It is a further object of the present invention to provide a novel process for the preparation of zeolitic materials having B-CHA framework structure minimizing loss of surface area during preparation.

Thus, it is a further object of the present invention to provide a novel process for the preparation of zeolitic materials having B-CHA framework structure wherein the ratio of the [molar ratio (SiO$_2$:B$_2$O$_3$)] of the gel composition:[molar ratio (SiO$_2$:B$_2$O$_3$)] of the crystalline product having the chabazite structure as close as to 1 as possible.

It is a further object of the present invention to provide a novel process for the preparation of zeolitic materials having B-CHA framework structure resulting in essentially phase-pure chabazite avoiding impurities such as zeolite RUT.

It is a further object of the present invention to provide a novel process for the preparation of zeolitic materials having B-CHA framework structure resulting in essentially alkali-free and/or earth alkali-free chabazite.

It is a further object of the present invention to provide a novel process for the preparation of containing zeolitic materials having B-CHA framework structure, wherein the zeolitic material contains Si and Al in a high molar ratio of Si:Al.

Therefore, the present invention relates to a process for the preparation of zeolites having B-CHA framework structure and a composition comprising the molar ratio (n SiO$_2$):B$_2$O$_3$, wherein n is at least 10, the process comprising
 (i) preparation of an aqueous solution containing at least one source for B$_2$O$_3$, at least one source for SiO$_2$, at least one source of seeding crystals with chabazite structure, at least one organic structure directing agent (SDA) other than Tetramethylammonium hydroxide (TMAOH), acting as a template for the B-CHA structure, and Tetramethylammonium hydroxide (TMAOH), wherein the SDA or mixtures thereof are employed in such amounts that the aqueous solution in (i) exhibits a molar ratio of SDA:TMAOH of 0.01 to 5;
 (ii) hydrothermal crystallization of the aqueous solution according to (i);
wherein the ratio of the [molar ratio (SiO$_2$:B$_2$O$_3$)] of the gel composition:[molar ratio (SiO$_2$:B$_2$O$_3$)] of the crystalline product having the chabazite structure greater than 0.5.

This invention is a cost efficient synthesis route to essentially alkali/earth alkali metal free B-chabazite by utilizing TMAOH as a replacement for alkali/earth alkali metal hydroxides (e.g. NaOH or KOH). The synthesis results in essentially phase-pure chabazite avoiding impurities such as zeolite RUT. Additionally, the inventive process leads to a product having a [SiO$_2$:B$_2$O$_3$] molar ratio that is very close to the [SiO$_2$:B$_2$O$_3$] of the gel composition.

As used in this specification and the appended claims, the singular forms "a", "an" and "the" include plural referents unless the context clearly indicates otherwise. Thus, for example, reference to "a catalyst" includes a mixture of two or more catalysts, and the like.

The term "gel composition" as used in this specification shall mean the molar ratios of reactants expressed on an oxide basis, e.g. SiO$_2$ and B$_2$O$_3$.

The term "product" as used in this specification shall mean the crystalline powder having the chabazite structure.

Preferably the ratio of the [molar ratio (SiO$_2$:B$_2$O$_3$)] of the gel composition:[molar ratio (SiO$_2$:B$_2$O$_3$)] of the crystalline product having the chabazite structure is greater than about 0.6. Even more preferred that molar ratio is greater than 0.7. Even more preferred that molar ratio is greater than 0.8. Even more preferred that molar ratio is greater than 0.85. Even more preferred that molar ratio is greater than about 0.9. Preferably that molar ratio is in the range of about 0.6 to 1, even more preferred from about 0.7 to 1, even more preferred from about 0.8 to 1, even more preferred from about 0.9 to 1.

Preferably the B-Chabazite molecular sieve includes all aluminosilicate, borosilicate, and gallosilicate compostions. These include, but are not limited to SSZ-13, SSZ-62, natural chabazite, zeolite K-G, Linde D, Linde R, LZ-218, LZ-235. LZ-236, and ZK-14.

Most preferably the material will have the borosilicate composition, such as SSZ-13 and SSZ-62$_{[B1]}$.

Generally, all suitable sources for B$_2$O$_3$ can be employed, however, a B$_2$O$_3$ source is preferably employed which is free of alkali and/or earth alkali metal, in particular free of sodium. By way of example, borates and/or boric acid, metaboric acid, ammonium metaborate, and/or boric acid esters such as boric acid triethyl ester or boric acid trimethyl ester may be mentioned.

Generally, all suitable sources for SiO$_2$ can be employed, however, a SiO$_2$ source is preferably employed which is free of alkali and/or earth alkali metal, in particular free of sodium. By way of example, silicates, silica, silicic acid, colloidal silica, fumed silica, tetraalkoxysilanes, silica hydroxides, precipitated silica or clays may be mentioned. In this context, both so-called "wet-process silicon dioxide" as well as so called "dry-process silicon dioxide" can be employed. Colloidal silicon dioxide is, inter alia, commercially available as Ludox®, Syton®, Nalco®, or Snowtex®. "Wet process" silicon dioxide is, inter alia, commercially available as Hi-Sil®, Ultrasil®, Vulcasil®, Santocel®, Valron-Estersil®, Tokusil® or Nipsil®. "Dry process" silicon dioxide is commercially available, inter alia, as Aerosil®, Reolosil®, Cab-O-Sil®, Fransil® or ArcSilica®. Tetraalkoxysilanes, such as, for example, tetraethoxysilane or tetrapropoxysilane, may be mentioned.

According to preferred embodiments of the present invention, dry-process silica or colloidal silica is employed. If colloidal silica is employed, it is further preferred that said colloidal silica is stabilized without alkali and/or earth alkali metal, in particular without sodium. According to even more preferred embodiments where colloidal silica is used, the colloidal silica employed as aqueous solution in (i) is stabilized with ammonia.

Generally, the sources for B$_2$O$_3$ and SiO$_2$ can be employed in all conceivable amounts and molar ratios for the preparation of the aqueous solution in (i) with the proviso that in (ii), a zeolite having B-CHA framework structure is obtained.

According to a preferred embodiment of the present invention, the at least one source for SiO$_2$ and the at least one source for B$_2$O$_3$ are employed in such amounts that the aqueous solution obtained according to (i) exhibits a molar ratio $$(n\text{SiO}_2):\text{B}_2\text{O}_3$$

wherein n is at least 10, more preferably at least 15. More preferably, n is in the range of from 15 to 80, more preferably from 15 to 60, more preferably from 15 to 50 such as, e.g., 15, 20, 25, 30, 35, 40, 45, 50.

As far as the structure directing agent employed in (i) is concerned, no restriction exists with the proviso that a zeolitic material having B-CHA framework structure is obtained in (ii).

By way of example, a suitable N-alkyl-3-quinuclidinol, a suitable N,N,N-trialkyl-exoaminonorbornane, a suitable N,N,N-trimethyl-1-adamantylammonium compound, a suitable N,N,N-trimethyl-2-adamantylammonium compound, a suitable N,N,N-trimethylcyclohexylammonium compound, a suitable N,N-dimethyl-3,3-dimethylpiperidinium compound, a suitable N,N-methylethyl-3,3-dimethylpiperidinium compound, a suitable N,N-dimethyl-2-methylpiperidinium compound, 1,3,3,6,6-pentamethyl-6-azonio-bicyclo (3.2.1)octane, N,N-dimethylcyclohexylamine, or a suitable N,N,N-trimethylbenzylammonium compound may be mentioned. As suitable compounds, the hydroxides of above-mentioned compounds may be mentioned. Preferably N,N, N-trimethyl-1-adamantylammonium hydroxide is employed as SDA.

Preferably, a suitable N,N,N-trimethyl-1-adamantylammonium (1-adamantyltrimethyl ammonium) compound is employed. Optionally, this suitable 1-adamantyltrimethylammonium compound can be employed in combination with at least one further ammonium compound such as, e.g., a N,N,N-trimethylbenzylammonium (benzyltrimethylammonium) compound or a tetramethylammonium compound or a mixture of a benzyltrimethylammonium and a tetramethylammonium compound.

As far as the ammonium compounds are concerned, it is conceivable that a suitable salt of the ammonium compounds is employed. Preferably, if such salt is employed, this salt or the mixture of salts should impart the desired pH to the aqueous solution to be subjected to hydrothermal crystallization. If necessary, a suitable base such as, for example, a suitable hydroxide source, can be added, in addition said salt(s) to impart said pH. Preferably, according to the present invention, the ammonium salt or ammonium salts as such are the suitable base, preferably the hydroxide source, i.e., it is preferred that the ammonium compound(s) is/are employed as hydroxide(s).

As far as the ammonium compounds are concerned, it is also possible according to the present invention to employ the respective amine compound, if necessary in combination with at least one suitable base such as, e.g. a suitable hydroxide source Generally, the sources for $B_2O_3$ and $SiO_2$ and the structure directing agent can be employed in all conceivable amounts and molar ratios for the preparation of the aqueous solution in (i) with the proviso that in (ii), a zeolite having B-CHA framework structure is obtained.

According to a preferred embodiment of the present invention, the at least one source for $SiO_2$ and the at least one source for $B_2O_3$ are employed in such amounts that the aqueous solution obtained according to (i) exhibits a molar ratio of structure directing agent (SDA), optionally the sum of SDAs, relative to the sum of (n $B_2O_3$) and $SiO_2$, (p SDA):((n $SiO_2$)+$B_2O_3$)

wherein p is at least 0.035, more preferably at least 0.07, more preferably at least 0.15. Even more preferably, p is less than or equal to 0.6, more preferably less than or equal to 0.5, more preferably less than or equal to 0.4, more preferably less than or equal to 0.3, and more preferably less than or equal to 0.2. Thus, according to preferred embodiments of the present invention, p is in the range of from 0.035 to 0.6, more preferably from 0.07 to 0.4, and even more preferably from 0.15 to 0.2.

Preferably, the pH of the aqueous solution obtained from (i) and subjected to hydrothermal crystallization according to (ii) is at least 10, more preferably at least 11, and even more preferably at least 12. More preferably, the pH of the aqueous solution subjected to hydrothermal crystallization according to (ii) is in the range of from 10 to 14, even more preferred in the range from 12 to 14.

Thus, the present invention also relates above-described process, wherein the pH of the aqueous solution subjected to (ii) is in the range of from 12 to 14.

Tetramethylammonium hydroxide is used to adjust the pH and OH/Si of the aqueous solution subjected to hydrothermal crystallization according to (ii) so that the pH has above-described values, depending on the starting materials employed.

According to a preferred embodiment of the present invention, the structure directing agent (SDA) or mixtures thereof are employed in such amounts that the aqueous solution obtained according to (i) exhibits a molar ratio of tetramethylammonium hydroxide (TMAOH) relative to structure directing agent (SDA), (rTMAOH):(SDA)

wherein r is preferably in the range of 0.1 to 5 preferred 0.7 to 5, even more preferred 0.7 to 4, even more preferred 1.1 to 3, even more preferred 1.1 to 1.6.

In addition to tetramethylammonium hydroxide a base which does not contain alkali and/or earth alkali metal, preferably a base which does not contain sodium, can be used for adjusting the pH.

According to a preferred embodiment of the present invention, the $OH^-$/Si ratio in the aqueous solution obtained according to (i) is preferably in the range of 0.1 to 1, more preferred in the range of 0.1 to 0.5, even more preferred in the range of 0.1 to 0.3, even more preferred in the range of 0.1 to 0.2, even more preferred in the range of 0.12 to less than 0.2.

As already described above, the at least one source for $SiO_2$ and the at least one source for $B_2O_3$, are free of alkali and/or earth alkali metals, in particular free of sodium. According to an even more preferred embodiment of the present invention, the aqueous solution obtained in (i) and subjected to hydrothermal crystallization in (ii) is free of alkali and/or earth alkali metals, in particular free of sodium.

The term "free of alkali metal" and "free of sodium", as used in this context of the present invention relates to the fact that no starting materials are employed which contain sodium, in particular alkali metal as essential component. However, this term does not exclude such embodiments where the starting materials explicitly described contain certain amounts of sodium, in particular alkali metals as impurities. By way of example, such impurities are typically present in amounts of 1000 ppm or less, preferably 500 ppm or less, more preferably 300 ppm or less. The term "an alkali metal content of X ppm or less" as used in the context of the present, relates to an embodiment according to which the sum of all alkali metals present does not exceed X ppm. In all cases alkali metal content is reported on the basis of its metal oxide e.g. 1000 ppm $Na_2O$. It is recognized that cationic $Na^+$ resides within the zeolite pores.

Therefore, the present invention also relates to above-described process, wherein the aqueous solution subjected to hydrothermal crystallization according to (ii) is free of alkali and/or earth alkali metals, in particular free of sodium.

According to further embodiments, the aqueous solution obtained according to (i) may contain further metals, such as, for example, Ti, transition metals, such as Cu, Fe, Mo and/or Co, and/or lanthanides, such as La, Ce, Y. Cu and/or Fe are preferred, even more preferred Cu being the only further metal of the aqueous solution of (i).

Generally, all suitable sources for Cu can be employed. By way of example, copper (II) oxide, copper acetate, copper nitrate, copper chloride, copper fluoride, copper sulfate, copper carbonate, copper oxalate and ammoniacal solutions of copper ions, for example copper amine carbonate, may be mentioned. Preferably, an aqueous solution of at least one Cu salt or oxide is employed. Optionally an aqueous solution of at least one suitable Cu salt is employed which, apart from water and the Cu salt, contains ammonia. Preferred are copper oxide and Cu salts, e.g. copper acetate, copper fluoride, copper chloride and ammoniacal solutions of copper ions. Even more preferred is the use of copper acetate and/or ammoniacal solutions of copper ions, for example copper amine carbonate or copper tetraamine. The use of a mixture of two or more suitable sources for Cu may be mentioned. Panias et al. (Oryktos Ploutos (2000), 116, 47-56) report the speciation of divalent copper ions in aqueous ammoniacal solutions. Amino complexes of divalent copper $Cu(NH_3)_n^{2+}$ are in practice the predominant forms in which copper is encountered in mildly acidic to strongly alkaline ammoniacal solutions. The ion $Cu(NH_3)_4^{2+}$ is the most important ion of the $Cu^{2+}$—$NH_3$—$H_2O$ system. It shows a wide region of stability varying from mildly acidic solutions with a pH of 5 to strongly alkaline solutions with a pH of 14. The hydroxyl complexes of divalent copper are met with in the $Cu^{2+}$—$NH_3$—$H_2O$ system only in very strongly alkaline solutions with a pH greater than 12 and in dilute ammoniacal solutions with a total ammonia concentration less than 0.1M. In ammoniacal solutions copper is encountered in the form of free $Cu^{2+}$ ions only in highly acidic aqueous solutions.

Generally, the sources for $B_2O_3$ and $SiO_2$ and Cu can be employed in all conceivable amounts and molar ratios for the preparation of the aqueous solution in (i) with the proviso that in (ii), a Cu containing zeolite having B-CHA framework structure is obtained.

According to a preferred embodiment of the present invention, the at least one source for $SiO_2$ and the at least one source for $B_2O_3$ are employed in such amounts that the aqueous solution obtained according to (i) exhibits a molar ratio of Cu relative to the sum of (n $B_2O_3$) and $SiO_2$, $$(m\ Cu):((n\ SiO_2)+B_2O_3)$$

wherein m is at least 0.005, more preferably at least 0.01, more preferably at least 0.02. Even more preferably, said m is less than or equal to 0.08, more preferably less than or equal to 0.07, more preferably less than or equal to 0.06, more preferably less than or equal to 0.05, and more preferably less than or equal to 0.04. Thus, according to preferred embodiments of the present invention, m is in the range of from 0.005 to 0.08, more preferably from 0.01 to 0.06, and even more preferably from 0.02 to 0.04.

Thus, the present invention also relates to above-described process wherein, for the preparation of the aqueous solution according to (i), the at least one source for $SiO_2$, the at least one source for $B_2O_3$ and the Cu source are employed in such amounts that the aqueous solution obtained according to (i) exhibits a molar ratio $$(n\ SiO_2):B_2O_3$$

wherein n is at least 10, preferably at least 15, more preferably in the range of from 15 to 70, and a molar ratio $$(m\ Cu):((n\ SiO_2)+B_2O_3)$$

wherein m is at least 0.005, preferably in the range of from 0.02 to 0.04.

Generally, there are no specific restrictions in which order the starting materials are mixed to obtain the aqueous solution according to (i).

According to one embodiment of the present invention, an aqueous solution containing the at least one structure directing agent and TMAOH is optionally mixed with ammonia. In this solution, the at least one source for $B_2O_3$ and the at least one source for $SiO_2$, are suspended.

According to another embodiment of the present invention, an aqueous solution containing the at least one source for $B_2O_3$, is admixed with the at least structure directing agent and TMAOH, wherein, subsequently, the at least one source for $SiO_2$, is added.

When copper is added to the synthesis gel it can be added in all possible addition orders. It is preferred to add the copper solution as the final reactant.

According to a preferred embodiment of the present invention, the at least one source for $SiO_2$ and the at least one source for $B_2O_3$ are employed in such amounts that the aqueous solution obtained according to (i) exhibits a molar ratio of water relative to the sum of (n $B_2O_3$) and $SiO_2$, relative to the structure directing agent (SDA), optionally the sum of SDAs, and TMAOH $$(q\ H_2O):[(n\ SiO_2)+B_2O_3]:(s\ SDA):(t\ TMAOH)$$

wherein q is preferably at least 10, more preferably at least 15 and even more preferably at least 20,
wherein n is preferably 5 to 1000, more preferred 5 to 100, even more preferred 10 to 50;
wherein s is preferably 0.025 to 0.1, more preferred 0.05 to 0.075, even more preferred 0.05 to 0.065;
wherein t is preferably 0.01 to 0.1 more preferred 0.01 to 0.1, even more preferred 0.03 to 0.1.

Even more preferably, said q is less than or equal to 70, more preferably less than or equal to 65, more preferably less than or equal to 60, more preferably less than or equal to 55, and more preferably less than or equal to 50. Thus, according to preferred embodiments of the present invention, q is in the range of from 10 to 70, more preferably from 15 to 60, and even more preferably from 20 to 50.

The temperature during the preparation of the aqueous solution according to (i) is preferably in the range of from 10 to 40° C., more preferably in the range of from 15 to 35° C., and particularly preferably in the range of from 20 to 30° C.

Generally, all suitable sources for seeding crystals of chabazite structure can be employed, however, seeding source is preferably employed which is free of alkali and/or earth alkali metal, in particular free of sodium. While there are no particular restrictions as to the seeding material with the proviso that the desired B-chabazite material is obtained, it is preferred that chabazite with the same composition (e.g. borosilicate) as the target product will be employed. Further, it is conceivable that it may be possible to employ, as seeding material, as-synthesized chabazite zeolite, dried chabazite zeolite such as, for example, spray-dried and non-calcined chabazite zeolite, or (optionally dried) calcined chabazite zeolite.

Further, it is conceivable that employing from 0.1 to 10 wt.-% seeding material, based on Si contained in the synthesis mixture, calculated as $SiO_2$, may be advantageous. Exemplary amounts of seeding material, based on Si in the synthesis mixture, are, for example, 1 to 9 wt.-%, 2 to 8 wt.-%, 3 to 7 wt.-%, or 4 to 6 wt.-%.

In principle, it is possible to heat the aqueous solution according to (ii) under any suitable pressure and any suitable temperature or temperatures, provided that it is ensured that zeolitic material of B-CHA framework structure crystallizes in the solution. Here, temperatures which, at the chosen pressure, are above the boiling point of the solution obtained according to (i) are preferred. Temperatures of up to 200° C.

at atmospheric pressure are more preferred. The term "atmospheric pressure" as used in the context of the present invention designates a pressure of, ideally, 101 325 Pa, which, however, may be subject to variations within the limits known to the person skilled in the art. According to a particularly preferred embodiment of the process according to the invention, the hydrothermal crystallization according to (ii) is carried out in an autoclave.

The temperature used in the autoclave according to (ii) is preferably in the range of from 100 to 200° C., more preferably in the range of from 130 to 190° C., more preferably in the range of from 140 to 180° C.

According to an even more preferred embodiment of the present invention, the autoclave employed for carrying out the hydrothermal crystallization according to (ii) exhibits means for heating and cooling the content of the autoclave, more preferably external heating means such as a suitable heating/cooling jacket.

This temperature to which the aqueous solution is heated according to (ii) can in principle be maintained until the crystallization has taken place to the desired extent. Here, time periods of up to 340 h, more preferably from 1 h to 260 h, and more preferably from 8 to 110 h are preferred. According to further preferred embodiments of the present invention, crystallization times are in the range of from 12 to 72 h, more preferably from 24 to 48 h.

During crystallization, pressure or pressures in the range of from 1 to 20 bar, more preferably from 2 to 10 bar and even more preferably from 5 to 8 bar are especially preferred.

The aqueous solution is preferably suitably stirred for the crystallization according to (ii). It is also possible to rotate the reaction vessel in which the crystallization is carried out. Typical values as far as said stirring or rotation is concerned are in the range of from 40 to 250 rpm such as from 50 to 250 rpm (revolutions per minute).

After hydrothermal crystallization according to (ii), the mother liquor containing the inventive zeolitic material having B-CHA framework structure is suitably separated from said mother liquor. Prior to separation, the temperature of the mother liquor containing the zeolitic material may be suitably decreased to a desired value employing a suitable cooling rate. Typical cooling rates are in the range of from 15 to 45° C./h, preferably from 20 to 40° C./h, and even more preferably from 25 to 35° C./h.

Typical temperatures of the cooled mother liquor containing the inventive zeolitic material having B-CHA framework structure are in the range of from 25 to 55° C., preferably of from 35 to 50° C.

According to one embodiment of the process according to the invention, the zeolitic material having B-CHA framework structure is separated in a suitable manner in at least one step from the suspension, i.e. the mother liquor containing the zeolitic material, obtained from (ii). This separation can be effected by all suitable methods known to the skilled person, for example, by decantation, filtration, ultrafiltration, diafiltration or centrifugation methods or, for example, spray drying and spray granulation methods.

Therefore, the present invention also relates to above-described process, additionally comprising
(iii) separating the zeolitic material from the suspension obtained according to (ii).

If, e.g., the zeolitic material is separated by filtration or centrifugation or concentration of the suspension obtained according to (ii), it is preferred that that the separated zeolitic material is suitably dried. Before the separated zeolitic material is dried, it may be washed at least once with a suitable washing agent, wherein it is possible to use identical or different washing agents or mixtures of washing agents in the case of at least two of the washing steps and to use identical or different drying temperatures in the case of at least two drying steps.

Washing agents used may be, for example, water, alcohols, such as, for example, methanol, ethanol or propanol, or mixtures of two or more thereof as known to a skilled person in the art.

The drying temperatures here are preferably in the range of from room temperature to 200° C., more preferably of from 60 to 180° C., more preferably of from 80 to 160° C. and more preferably in the range of from 100 to 150° C. The durations of drying are preferably in the range of from 2 to 48 h, more preferably of from 4 to 36 h.

Moreover, the present invention also relates to the process as described above, additionally comprising
(iii) separating the zeolitic material from the suspension obtained according to (ii);
(iv) drying the zeolitic material, separated according to (iii), at a temperature in the range of from 100 to 150° C.

According to a particularly preferred embodiment of the process according to the invention, the zeolitic material obtained according to (iii) or (iv), preferably after (iv), is calcined in at least one additional step.

Therefore, the present invention also relates to above-described process, additionally comprising (v) calcining the zeolitic material.

It is possible in principle to feed the suspension comprising the zeolitic material directly to the calcination. Preferably, the zeolitic material is separated from the suspension, as described above, according to (iii), before the calcination. Even more preferably, the zeolitic material is dried before the calcination. The calcination conditions are known to a person skilled in the art.

Accordingly, the present invention also relates to above-described process, additionally comprising
(iii) separating the zeolitic material from the suspension obtained according to (ii);
(iv) drying the zeolitic material, separated according to (iii), preferably at a temperature in the range of from 100 to 150° C.;
(v) calcining the zeolitic material, dried according to (iv), preferably at a temperature in the range of from 300 to 750° C.

The present invention also relates to the zeolitic material having framework structure B-CHA, obtainable or obtained by above-described process.

The present invention also relates to the zeolitic materials as such, having framework structure B-CHA, having a composition comprising the molar ratio (n $SiO_2$):$B_2O_3$, wherein n is at least 10, and wherein ratio of the [molar ratio ($SiO_2$:$B_2O_3$)] of the gel composition:[molar ratio ($SiO_2$:$B_2O_3$)] of the crystalline product having the chabazite structure is greater than 0.5.

In this context, the term "zeolitic material as such, having framework structure B-CHA" relates to the calcined zeolitic material which is essentially free of water and from which the structure directing agent and any other organic compounds such as organic acids have been essentially removed by calcination.

Preferably, n is in the range of from 15 to 70, more preferably in the range of from 15 to 60, more preferably in the range of from 15 to 50. By way of example, especially preferred values of n are 15, 20, 25, 30, 40, 45, 50.

Preferably the ratio of the [molar ratio ($SiO_2$:$B_2O_3$)] of the gel composition:[molar ratio ($SiO_2$:$B_2O_3$)] of the crystalline product having the chabazite structure is greater than about 0.6. Even more preferred that molar ratio is greater than 0.7. Even more preferred that molar ratio is greater than 0.8. Even more preferred that molar ratio is greater than 0.85. Even more preferred that molar ratio is greater than about 0.9. Preferably that molar ratio is in the range of about 0.6 to 1, even more preferred from about 0.7 to 1, even more preferred from about 0.8 to 1, even more preferred from about 0.9 to 1.

Even more preferably, the calcined zeolitic material described above is free of alkali and/or earth alkali metals, in particular free of sodium. The term "free of alkali metal" and "free of sodium", as used in this context of the present invention relates to zeolitic materials having an alkali metal content, and a sodium content, respectively, of 1000 ppm or less, preferably 500 ppm or less, more preferably 300 ppm or less.

If Cu is employed in the aqueous solution according to (i), the Cu content of the copper containing B-Chabazite molecular sieve, calculated as CuO, is preferably at least about 2 wt.-% and even more preferably at least about 2.5 wt.-%, in each case based on the total weight of the calcined Chabazite molecular sieve. Even more preferably, the Cu content of the Chabazite molecular sieve, calculated as CuO, is in the range of up to about 5 wt.-%, and even more preferably of up to about 3.5 wt.-%, in each case based on the total weight of the calcined Chabazite molecular sieve reported on a volatile free basis. Therefore, preferred ranges of the Cu content of the Chabazite molecular sieve, calculated as CuO, are from about 2 to about 5 wt.-%, and even more preferably from about 2.5 to about 3.5 wt.-%, and even more preferably from about 2.75 to about 3.25 wt.-%, in each case based on the total weight of the calcined Chabazite molecular sieve. All wt.-% values are reported on a volatile free basis.

If Cu is employed in the aqueous solution according to (i), the atomic ratio of copper to boron exceeds preferably about 0.1. More preferred the ratio of copper to boron is from about 0.25 to about 0.5. Even more preferred the ratio of copper to boron is from about 0.3 to about 0.4.

According to one embodiment of the present invention, the edges of at least 90%, preferably at least 95% of the crystallites of the calcined zeolitic material as described above or of the calcined zeolitic material obtainable or obtained according to the process as described above have a mean length in the range of from 0.01 to 10 microns, more preferred in the range from 0.1 to 5 microns, even more preferred in the range from 0.1 to 0.5 micrometer, determined by SEM.

According to a preferred embodiment of the present invention, the chabazite framework is phase-pure having an impurity of other zeolitic frameworks, such as RUT, of preferably less than 5%, even more preferred less than 2%, even more preferred less than 1%, as determined by X-ray Diffraction.

According to a preferred embodiment of the present invention, the calcined zeolitic material, obtainable or obtained by the process of the present invention, or the zeolitic material as such, having B-CHA framework structure, has a TOC content of 0.1 wt.-% or less, based on the total weight of the zeolitic material.

According to a preferred embodiment of the present invention, the calcined zeolitic material, obtainable or obtained by the process of the present invention, or the zeolitic material as such, having B-CHA framework structure, has a BET surface, determined according to DIN 66131, in the range of from 300 to 700 m²/g, preferably of from 400 to 700 m²/g.

According to a preferred embodiment of the present invention, the calcined zeolitic material, obtainable or obtained by the process of the present invention, or the zeolitic material as such, having B-CHA framework structure, has a Langmuir surface, determined according to DIN 66135, in the range of from 400 to 975 m²/g, preferably of from 550 to 975 m²/g.

The zeolitic material according to the present invention may be provided in the form of a powder or a sprayed material obtained from above-described separation techniques, e.g. decantation, filtration, centrifugation, or spraying.

In many industrial applications, it is often desired on the part of the user to employ not the zeolitic material as powder or sprayed material, i.e. the zeolitic material obtained by the separation of the material from its mother liquor, optionally including washing and drying, and subsequent calcination, but a zeolitic material which is further processed to give moldings. Such moldings are required particularly in many industrial processes, e.g. in many processes wherein the zeolitic material of the present invention is employed as catalyst or adsorbent. Such moldings are generally known to a person skilled in the art.

Accordingly, the present invention also relates to a molding comprising the zeolitic material having framework structure CHA of the present invention.

In general, the zeolitic material described above can be used as molecular sieve, adsorbent, catalyst, catalyst support or binder thereof. Especially preferred is the use as catalyst. For example, the zeolitic material can be used as molecular sieve to dry gases or liquids; for selective molecular separation, e.g. for the separation and/or storage of hydrocarbons or amides; as ion exchanger; as chemical carrier; as adsorbent, in particular as adsorbent for the separation of hydrocarbons or amides; or as catalyst. Most preferably, the zeolitic material according to the present invention is used as catalyst.

Therefore, the present invention also relates to a catalyst, preferably a molded catalyst, containing the zeolitic material having B-CHA framework structure as described above. Moreover, the present invention relates to the use of the zeolitic material having CHA framework structure as described above as a catalyst.

Moreover, the present invention relates to a method of catalyzing a chemical reaction wherein the zeolitic material having B-CHA framework structure according to the present invention is employed as catalytically active material.

Among others, said catalyst may be employed as catalyst for the selective reduction (SCR) of nitrogen oxides $NO_x$; for the oxidation of $NH_3$, in particular for the oxidation of $NH_3$ slip in diesel systems; for the decomposition of $N_2O$; for soot oxidation; for emission control in Advanced Emission Systems such as Homogeneous Charge Compression Ignition (HCCI) engines; as additive in fluid catalytic cracking (FCC) processes; as catalyst in organic conversion reactions; as catalyst in the production of light olefins from a feedstock comprising an oxygenate or mixtures of oxygenates, such as the methanol to olefin reaction; as catalyst in "stationary source" processes; or as catalyst in methanol to olefins.

Most preferably, the zeolitic material according to the present invention or the zeolitic material obtainable of obtained according to the present invention is used as catalyst, preferably as molded catalyst, still more preferably as a molded catalyst wherein the zeolitic material is deposited on a suitable refractory carrier, still more preferably on a "honeycomb" carrier, for the selective reduction of nitrogen oxides $NO_x$, i.e. for SCR (selective catalytic reduction) of nitrogen oxides. In particular, the selective reduction of nitrogen oxides wherein the zeolitic material according to the present invention is employed as catalytically active material is carried out in the presence ammonia or urea. While ammonia is the reducing agent of choice for stationary power plants, urea is the reducing agent of choice for mobile SCR systems. Typically, the SCR system is integrated in the engine and vehicle design and, also typically, contains the following main components: SCR catalyst containing the zeolitic material according to the present invention; a urea storage tank; a urea pump; a urea dosing system; a urea injector/nozzle; and a respective control unit.

Therefore, the present invention also relates to a method for selectively reducing nitrogen oxides $NO_x$, wherein a gaseous stream containing nitrogen oxides $NO_x$, preferably also containing ammonia and/urea, is contacted with the zeolitic material according to the present invention or the zeolitic material obtainable of obtained according to the present invention, preferably in the form of a molded catalyst, still more preferably as a molded catalyst wherein the zeolitic material is deposited on a suitable refractory carrier, still more preferably on a "honeycomb" carrier.

The term nitrogen oxides, $NO_x$, as used in the context of the present invention designates the oxides of nitrogen, especially dinitrogen oxide ($N_2O$), nitrogen monoxide (NO), dinitrogen trioxide ($N_2O_3$), nitrogen dioxide ($NO_2$), dinitrogen tetroxide ($N_2O_4$), dinitrogen pentoxide ($N_2O_5$), nitrogen peroxide ($NO_3$).

The nitrogen oxides which are reduced using a catalyst containing the zeolitic material according to the present invention or the zeolitic material obtainable of obtained according to the present invention may be obtained by any process, e.g. as a waste gas stream. Among others, waste gas streams as obtained in processes for producing adipic acid, nitric acid, hydroxylamine derivatives, caprolactame, glyoxal, methyl-glyoxal, glyoxylic acid or in processes for burning nitrogeneous materials may be mentioned.

Especially preferred is the use of a catalyst containing the zeolitic material according to the present invention or the zeolitic material obtainable or obtained according to the present invention for removal of nitrogen oxides $NO_x$ from exhaust gases of internal combustion engines, in particular diesel engines, which operate at combustion conditions with air in excess of that required for stoichiometric combustion, i.e., lean.

Therefore, the present invention also relates to a method for removing nitrogen oxides $NO_x$ from exhaust gases of internal combustion engines, in particular diesel engines, which operate at combustion conditions with air in excess of that required for stoichiometric combustion, i.e., at lean conditions, wherein a catalyst containing the zeolitic material according to the present invention or the zeolitic material obtainable or obtained according to the present invention is employed as catalytically active material.

The following examples shall further illustrate the process and the materials of the present invention.

EXAMPLES

Example 1

One-Step Synthesis of TMAOH Containing Borosilicate CHA (Gel=26.6 $SiO_2$:$B_2O_3$)

1.1 Preparation of the Synthesis Gel
The following starting materials were employed:
Trimethyl-1-adamantylammonium hydroxide (TMAA, 13.26 wt.-% in water)
Tetramethylammonium hydroxide (TMAOH, 25 wt.-% in water (Aldrich))
Boric Acid (Fisher, 99.6%)
Ludox AS40 (Grace Davison)
seeds of example A
In a beaker, 765.7 g of TMAA and 203.8 g of TMAOH solution were mixed. This solution was stirred for 10 min at room temperature. Then, 31 g of Boric Acid were added, and the resulting suspension was stirred for about 60 min. Subsequently, 999.6 g Ludox AS40 were added, and the resulting suspension was stirred for about 20 min.

The pH of the obtained suspension was 13.3.

The suspension had a composition with the following molar ratios: 36 $SiO_2$:2.7 Boric Acid: 2.6 TMAA: 3.0 TMAOH: 425 $H_2O$. This gel was transferred in a 2.5 L autoclave. Then 20 g of Chabazite from example A were added as seeds in the dried form.

1.2 Hydrothermal Crystallization

The autoclave was sealed and heated to a temperature of 160° C. The temperature of 160° C. was maintained for 72 h. Thereby, the mixture in the autoclave was stirred at 200 rpm (revolutions/minute).

1.3 Separation, Drying, and Calcination

After the hydrothermal crystallization, the resulting suspension had a pH of 11. The suspension was filtrated with a porcelain suction filter with a diameter of 15 cm. The wet product was heated to a temperature of 120° C. in air within 30 min and dried at 120° C. for 240 min. The dried product was then heated to a temperature of 600° C. within 240 min and calcined in air at 600° C. for 300 min. A sample of the calcined material was examined via XRD, and it was found that a zeolite having CHA framework. Crystallinity of the Chabazite was reported as 93%. Yield was 419 g. The material contained 0.06 wt % $Na_2O$ reported on a volatile-free basis. C was less than 0.1 wt %.

Example 2

Importance of Seeds for Example 1

The same reaction conditions were used as reported in Example 1, for a gel composition of 30 $SiO_2$:$B_2O_3$, with the exception that no seed crystals were added. X-ray diffraction indicated that the product was not pure Chabazite.

Example 3

Production of a Cu Containing Zeolitic Material having CHA Framework Structure, Additionally $SiO_2$:$B_2O_3$ 3.1 Preparation of the Synthesis Gel
The following starting materials were employed:
Trimethyl-1-adamantylammonium hydroxide (TMAA, 13.26 wt.-% in water)
Tetramethylammonium hydroxide (TMAOH, 25 wt.-% in water (Aldrich))
Boric Acid (Fisher, 99.6%)
[Cu(NH$_3$)$_4$]CO$_3$ complex (14.5 wt % Cu)
Ludox AS40 (Grace Davison)
seeds of example B
In a beaker, 724.8 g of TMAA and 229 g of TMAOH solution were mixed. This solution was stirred for 10 min at room temperature. Then, 29.2 g of Boric Acid were added, and the resulting suspension was stirred for about 60 min. Subsequently, 73.1 g of the [Cu(NH$_3$)$_4$]CO$_3$ solution were added and stirred for about 10 min. Subsequently, 943.9 g Ludox AS40 were added, and the resulting suspension was stirred for about 20 min.

The pH of the obtained suspension was 13.2.

The suspension had a composition with the following molar ratios: 36 $SiO_2$:2.7 Boric Acid:2.6 TMAA:3.6 TMAOH:0.96 Cu amine:454 $H_2O$. This gel was transferred in a 2.5 L autoclave. Then 20 g of Chabazite from example B were added as seeds in the dried form.

3.2 Hydrothermal Crystallization

The autoclave was sealed and heated to a temperature of 160° C. The temperature of 160° C. was maintained for 72 h. Thereby, the mixture in the autoclave was stirred at 200 rpm (revolutions/minute).

3.3 Separation, Drying, and Calcination

After the hydrothermal crystallization, the resulting suspension had a pH of 11. The suspension was filtrated with a porcelain suction filter with a diameter of 15 cm. The wet product was heated to a temperature of 120° C. in air within 30 min and dried at 120° C. for 240 min. The dried product was then heated to a temperature of 600° C. within 240 min and calcined in air at 600° C. for 300 min. A sample of the calcined material was examined via XRD, and it was found that a zeolite having CHA framework. Crystallinity of the Chabazite was reported as 88%. Yield was 416 g. The material contained 0.09 wt % $Na_2O$ reported on a volatile-free basis. C was less than 0.2 wt %.

Example 4

Importance of Seeds for Example 3

The same reaction conditions were used as reported in Example 1, for a gel composition with the following molar ratios: 36 $SiO_2$:2.7 Boric Acid:2.6 TMAA:3.6 TMAOH:0.83 Cu amine:451 $H_2O$, with the exception that no seed crystals were added. X-ray diffraction indicated that the product was not Chabazite.

Example A

Synthesis of Seeds

A.1 Preparation of the Synthesis Gel

The following starting materials were employed:
Trimethyl-1-adamantylammonium hydroxide (TMAA, 13.26 wt.-% in water)
Sodium hydroxide (NaOH, >98% (Aldrich))
Boric Acid (Fisher, 99.6%)
Ludox AS40 (Grace Davison)

In a beaker, 835.4 g of TMAA and 29.1 g of NaOH solution were mixed. This solution was stirred for 10 min at room temperature. Then, 44.9 g of Boric Acid were added, and the resulting suspension was stirred for about 60 min. Subsequently, 1090.6 g Ludox AS40 were added, and the resulting suspension was stirred for about 20 min.

The pH of the obtained suspension was 13.2.

The suspension had a composition with the following molar ratios: 36 $SiO_2$:3.6 Boric Acid:2.6 TMAA:3.6 NaOH: 379 $H_2O$. This gel was transferred in a 2.5 L autoclave.

A.2 Hydrothermal Crystallization

The autoclave was sealed and heated to a temperature of 170° C. The temperature of 170° C. was maintained for 48 h. Thereby, the mixture in the autoclave was stirred at 200 rpm (revolutions/minute).

A.3 Separation, Drying, and Calcination

After the hydrothermal crystallization, the resulting suspension had a pH of 11.8. The suspension was filtrated with a porcelain suction filter with a diameter of 15 cm. The wet product was heated to a temperature of 120° C. in air within 30 min and dried at 120° C. for 240 min. The dried product was then heated to a temperature of 600° C. within 240 min and calcined in air at 600° C. for 300 min. A sample of the calcined material was examined via XRD, and it was found that a zeolite having CHA framework. Crystallinity of the Chabazite was reported as 95%. Yield was 391 g. The material contained 1.3 wt % $Na_2O$ reported on a volatile-free basis. C was less than 0.1 wt %.

A.4 Ammonium Exchange of Example A.3

38.1 g of ammonium nitrate was dissolved in 3810 g deionized water in a 10 Litre beaker. The solution was stirred throughout the experiment at 200 rpm. This solution was then heated to 60° c before 380 g of calcined product from example A.3 was added. This material was ion-exchanged at 60° C. for a total of 1 hour. Then the material was filtered, washed to a conductivity <200 $\mu Scm^{-1}$. The material contained 0.1 wt % $Na_2O$ reported on a volatile-free basis. The $SiO_2$:$B_2O_3$ of the product was 47.5.

Example B

Synthesis of Seeds

B.1 Preparation of the Synthesis Gel

The following starting materials were employed:
Trimethyl-1-adamantylammonium hydroxide (TMAA, 13.26 wt.-% in water)
Sodium hydroxide (NaOH, >98% (Aldrich))
Boric Acid (Fisher, 99.6%)
Ludox AS40 (Grace Davison)

In a beaker, 841.7 g of TMAA and 29.3 g of NaOH solution were mixed. This solution was stirred for 10 min at room temperature. Then, 30.2 g of Boric Acid were added, and the resulting suspension was stirred for about 60 min. Subsequently, 1098.8 g Ludox AS40 were added, and the resulting suspension was stirred for about 20 min.

The pH of the obtained suspension was 13.

The suspension had a composition with the following molar ratios: 36 $SiO_2$:2.4 Boric Acid:2.6 TMAA:3.6 NaOH: 379 $H_2O$. This gel was transferred in a 2.5 L autoclave.

B.2 Hydrothermal Crystallization

The autoclave was sealed and heated to a temperature of 170° C. The temperature of 170° C. was maintained for 48 h. Thereby, the mixture in the autoclave was stirred at 200 rpm (revolutions/minute).

B.3 Separation, Drying, and Calcination

After the hydrothermal crystallization, the resulting suspension had a pH of 11.5. The suspension was filtrated with a porcelain suction filter with a diameter of 15 cm. The wet product was heated to a temperature of 120° C. in air within 30 min and dried at 120° C. for 240 min. The dried product was then heated to a temperature of 600° C. within 240 min and calcined in air at 600° C. for 300 min. A sample of the calcined material was examined via XRD, and it was found that a zeolite having CHA framework. Crystallinity of the Chabazite was reported as 91%. Yield was 422 g. The material contained 0.74 wt % $Na_2O$ reported on a volatile-free basis. C was less than 0.1 wt %.

B.4 Ammonium Exchange of Example B.3

33.1 g of ammonium nitrate was dissolved in 3310 g deionized water in a 10 Litre beaker. The solution was stirred throughout the experiment at 300 rpm. This solution was then heated to 60° c before 331 g of calcined product from example B.3 was added. This material was ion-exchanged at 60° C. for a total of 1 hour. Then the material was filtered, washed to a conductivity <200 $\mu Scm^{-1}$. The material contained 0.06 wt % $Na_2O$ reported on a volatile-free basis. The $SiO_2$:$B_2O_3$ of the product was 53.9.

The invention claimed is:

1. A process for the preparation of zeolites having B-CHA framework structure and a composition comprising the molar ratio (n $SiO_2$) : $B_2O_3$, wherein n is at least 10, the process comprising
   (i) preparation of an aqueous solution containing at least one source for $B_2O_3$, at least one source for $SiO_2$, at least one source of seeding crystals of chabazite structure, at least one organic structure directing agent (SDA) other than Tetramethylammonium hydroxide (TMAOH), acting as a template for the B-CHA structure, and Tetramethylammonium hydroxide (TMAOH), wherein the SDA or mixtures thereof are employed in such amounts that the aqueous solution in (i) exhibits a molar ratio of SDA : TMAOH of 0.01 to 5;
   (ii) hydrothermal crystallization of the aqueous solution according to (i);
   wherein the ratio of the molar ratio of $SiO_2$: $B_2O_3$ of the gel composition to the molar ratio of $SiO_2$ : $B_2O_3$ of the crystalline product having the chabazite structure is greater than 0.5; and B-CHA is essentially free of alkali metal and/or alkaline earth metal.

2. The process of claim 1, wherein the aqueous solution subjected to hydrothermal crystallization according to (ii) is free of alkali and/or earth alkali metals.

3. The process of claim 1, wherein the structure directing agent is 1-adamantyltrimethylammonium compound or a mixture of 1-adamantyltrimethylammonium compound and benzyltrimethylammonium compound.

4. The process of claim 1, wherein the pH of the aqueous solution obtained in (i) is in the range of 10 to 14.

5. The process of claim 1, wherein the ratio of SDA: TMAOH is in the range of 1.1 to 3.

6. The process of claim 1, wherein at least one source for $SiO_2$ and the at least one source for $B_2O_3$ are employed in such amounts that the aqueous solution obtained according to (i) exhibits a molar ratio of water relative to the sum of (n $B_2O_3$) and $SiO_2$, relative to the structure directing agent (SDA), optionally the sum of SDAs, and TMAOH $$(q\ H_2O):[(n\ SiO_2)+B_2O_3]: (s\ SDA): (t\ TMAOH)$$

wherein q is at least 10, n is 10 to 1000, s is 0.025 to 0.1 and t is 0.01 to 0.1.

7. The process of claim 1, wherein the $OH^-$/Si ratio in the aqueous solution obtained according to (i) is 0.1 to 0.3.

8. The process of claim 1, wherein the ratio of the molar ratio of $SiO_2$: $B_2O_3$ of the gel composition: to the molar ratio of $SiO_2$: $B_2O_3$ of the crystalline product having the chabazite structure is greater than 0.75.

9. The process of claim 1, wherein the aqueous solution obtained according to (i) contains Cu.

10. The process of claim 1, wherein for the preparation of the aqueous solution according to (i), the at least one source for $SiO_2$, the at least one source for $B_2O_3$ and the Cu source are employed in such amounts that the aqueous solution obtained according to (i) exhibits a molar ratio $$(n\ SiO_2): B_2O_3$$

wherein n is at least 15, and a molar ratio $$(m\ Cu): ((n\ SiO_2)+B_2O_3)$$

wherein m is at least 0.005.

11. The process of claim 1, additionally comprising
   (iii) separating the zeolitic material from the suspension obtained according to (ii);
   (iv) drying the zeolitic material, separated according to (iii), at a temperature in the range of from 100 to 150° C.;
   (v) calcining the zeolitic material, dried according to (iv), at a temperature in the range of from 300 to 750° C.

* * * * *